United States Patent [19]

Shell, Jr.

[11] Patent Number: 4,870,722

[45] Date of Patent: Oct. 3, 1989

[54] CABLE CLAMP STRIP

[75] Inventor: Forney L. Shell, Jr., Orange, Calif.

[73] Assignee: Northrop Corporation, Hawthorne, Calif.

[21] Appl. No.: 132,302

[22] Filed: Dec. 15, 1987

[51] Int. Cl.⁴ .......................................... B65D 63/10
[52] U.S. Cl. ................................. 24/16 R; 24/495; 24/517; 248/69; 248/74.1
[58] Field of Search ............... 24/16 R, 495, 517, 505; 248/68.1, 69, 74.1, 73, 49, 916, DIG. 9; 174/70 C; 294/31.2; 70/18, 19, 59; 269/287

[56] References Cited

U.S. PATENT DOCUMENTS

| | | | |
|---|---|---|---|
| 1,569,275 | 1/1926 | Green | 269/287 X |
| 1,668,953 | 5/1928 | Erickson | 248/74.1 X |
| 3,165,286 | 1/1965 | Johnson et al. | 248/49 X |
| 3,473,769 | 10/1969 | James | 248/69 |
| 3,888,439 | 6/1975 | Tuttle | 248/74.1 X |
| 4,676,472 | 6/1987 | Kamrud, Sr. | 248/68.1 X |
| 4,707,562 | 11/1987 | Whited | 24/517 X |

FOREIGN PATENT DOCUMENTS

| | | | |
|---|---|---|---|
| 2258582 | 6/1974 | Fed. Rep. of Germany | 248/73 |
| 1304739 | 8/1962 | France | 174/70 C |
| 489155 | 7/1938 | United Kingdom | 70/19 |

Primary Examiner—James R. Brittain
Attorney, Agent, or Firm—Terry J. Anderson; Robert B. Block

[57] ABSTRACT

An improved cable clamp strip for securing wires of a cable bundle in a predetermined orientation comprising: (1) a mounting base formed of a flexible, molded plastic with notches formed in its side edges for increased flexibility in a first direction and with notches formed in its lower surface for increased flexibility in a second direction; (2) closed retaining rings fixedly positioned on the upper surface of the mounting base; (3) apertured mounting projections extending upwardly from the upper surface of the mounting base; and (4) clamping ring halves adjustably secured with respect to the mounting projections. An aperture extends through the lower end of each clamping ring half with an long ring pin positionable through the apertures and the mounting projections to secure the clamping ring halves in a predetermined orientation on the mounting base. A plurality of apertures extends through the upper end of each clamping ring half with a short ring pin positionable through the apertures to secure the clamping ring halves in a predetermined orientation to thereby define the size of the opening through the clamping ring.

10 Claims, 2 Drawing Sheets

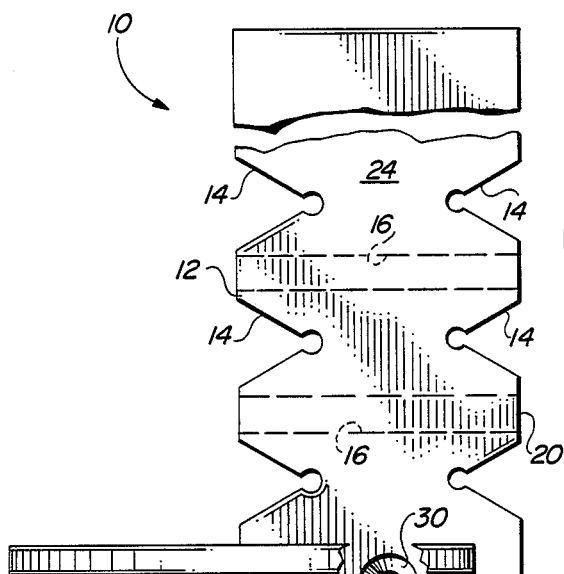
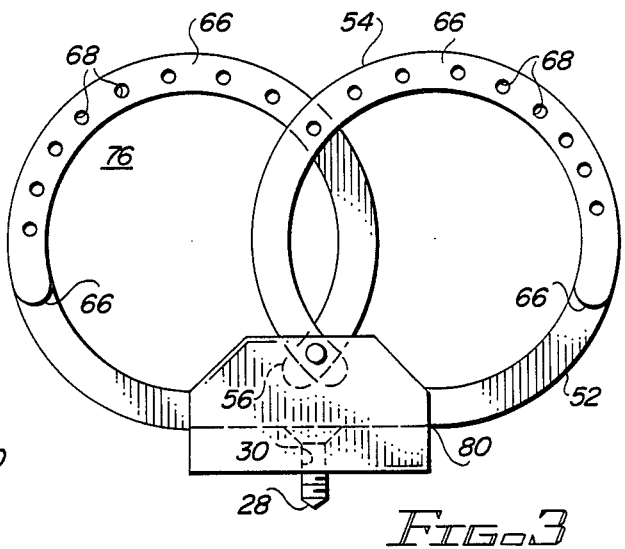
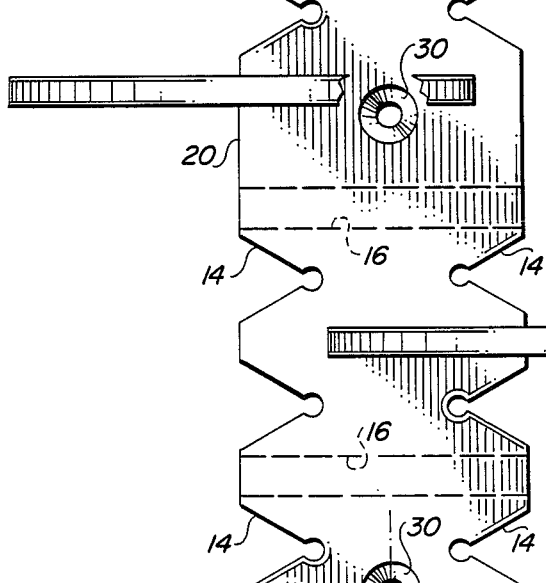
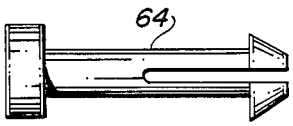
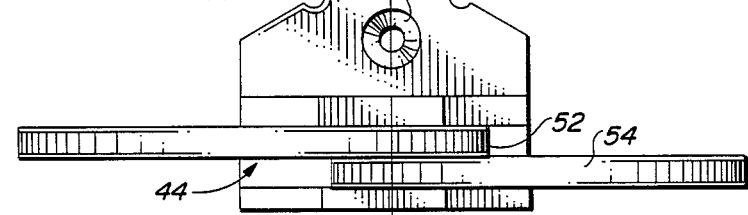
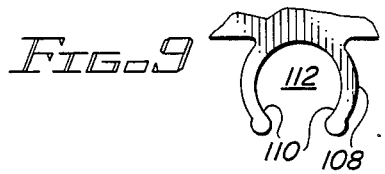
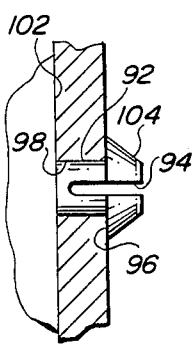
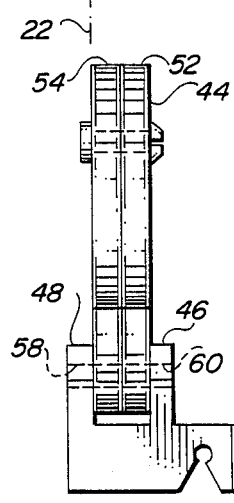
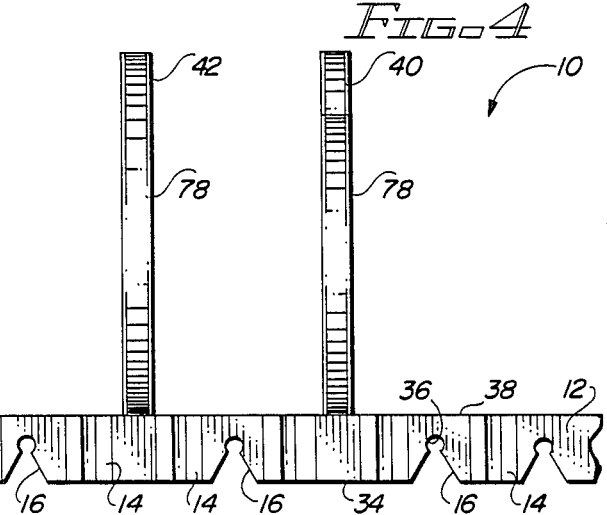

CABLE CLAMP STRIP

BACKGROUND OF THE INVENTION

1. Field of the Invention

This invention relates to cable clamp strips and, more particularly, to cable clamping rings and cable retaining rings on a common flexible mounting base which is attachable to a work surface for routing secured cables and wherein the clamping rings are adjustable in position and size for securing cables of varying diameters at predetermined locations.

2. Description of the Background Art

It has long been the practice to join together a large number of electrical wires along their lengths into a single continuous cable. In use, the cable is wrapped, laced, clamped, or otherwise secured at various intervals along its length by devices extending peripherally around the wires. When preselected wires are routed to or diverted from the cable, it is necessary to secure the cable with different securing devices to accommodate the different diameters of the cable. Since the cable and securing devices are usually held against some supporting surface through mounting brackets, it is also generally necessary to remove the securing devices from the mounting brackets in order to accommodate such different diameter cable.

While progress has been made in improving the efficiency and convenience of cable securing devices, most users still experience difficulty in securing together wires of cables and in routing such secured cables along predetermined paths, particularly when the cables vary in diameter along their lengths.

Various approaches are disclosed in the literature to improve the securement and routing of cable wires. By way of example, U.S. Pat. No. 3,082,984, to Larsson, et al teaches a wire bundling clamp formed of nylon, resilient plastic, or metal. The longitudinally extending strip is provided with holes for attachment to a base plate by means of screws or rivets. Encircling fingers form a channel in which the wires are retained. Larsson also teaches opposed spaced fingers as well as alternating fingers in which the wire may be inserted in a zig-zag fashion. Beman, in U.S. Pat. No. 2,684,512, teaches a form of clamping or retaining ring in which a lacing line or wire is used to retain a wiring harness within the flexible clamping fingers. Both opposed and alternating fingers are taught in U.S. Pat. No. 4,609,171, Matsui shows wire bundle clamps with resilient plastic curved members and various forms of latching means to allow the wires to be clamped within the ring or released for repair and replacement. U.S. Pat. No. 2,707,608 to Bunn shows a ring shaped retainer which is locked into position, clamping a tubular object therewithin, by means of holes through the pivoting retaining rings and a threaded fastener. In addition, U.S. Pat. No. 3,321,571 to Lynch and 3,571,863 to Logan show other flexible holders for enveloping wire bundles.

Although many such advances are noteworthy to one extent or another, none achieves the objective of an efficient, convenient to employ, inexpensive cable clamp device designed to accommodate the specific needs of the specific cable configuration. An optimum device would be something new which combines the benefits of the prior approaches without their shortcomings, i.e., a cable clamp strip which provides for securing cables of varying diameters, which accommodates the branching of cables along the lengths of the cable branches, is convenient to secure and to detach from the cables, which which is easy to route and reroute on a supporting surface, and which is economical to manufacture and utilize.

As illustrated by the great number of prior patents as well as commercial devices, efforts are continuously being made in an attempt to improve cable clamp strips to render them more efficient, easy to employ and inexpensive. None of these previous efforts, however, provides the benefits attendant with the present invention. Additionally, prior cable clamp strips do not suggest the present inventive combination of component elements arranged and configured as disclosed and claimed herein. The present invention achieves its intended purposes, objects and advantages over the prior art devices through a new, useful and unobvious combination of component elements, with the use of a minimum number of functioning parts, at a reasonable cost to manufacture, and by employing only readily available materials.

Therefore, it is an object of this invention to provide an improved cable clamp strip for securing together wires of a cable bundle in a predetermined orientation and for routing such secured wires in a predetermined path, the cable clamp strip comprising a mounting base formed of a flexible plastic with notches formed therein for increased flexibility and with apertured mounting projections extending upwardly from the upper surface of the mounting base and with clamping ring halves adjustably secured with respect to the mounting projections for adjustment of the size and position of the mounting ring halves with respect to the mounting base.

It is another object of this invention to releasably secure cables of varying diameters along their lengths by clamping rings of adjustable position and size.

It is a further object of the invention to route cable clamp strips and supported cables in a predetermined or variable path.

The foregoing has outlined some of the more pertinent objects of the invention. These objects should be construed to be merely illustrative of some of the more prominent features and applications of the intended invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The invention is defined by the appended claims with the specific embodiment shown in the attached drawings. For the purpose of summarizing the invention, the invention may be incorporated into an improved device for securing wires of a cable bundle in a predetermined orientation. The device comprises a first means formed of a flexible materal; apertured projections extending from a first surface of the first means; and clamping ring halves adjustably secured with respect to the first means through the apertured projections, the clamping ring halves being independently positionable with respect to the first means and to each other to define a variably sized and variably positionable opening therethrough for securing cable bundles of varying diameters to the first means. The first means is formed of a molded plastic with notches formed in its side edges for increased flexibility in a first direction and with notches formed in a second surface for increased flexibility in a second direction. Each clamping ring half is formed with an aperture in its end proximate the first means for adjustable positioning thereof with respect to the first means and with a plurality of apertures in its other end for the adjustable coupling between associated clamping ring halves. The device further includes pin means to couple together the upper ends of the clamping ring halves to each other and to couple the lower ends of the clamping ring halves to the first means. The device further includes closed retaining rings fixedly position on the first surface of the first means.

The invention may also be incorporated into improved clamping ring halves for use in association with a cable clamp strip. The clamping ring halves are adjustably secured with respect to mounting projections of a mounting base. An aperture extends through a first end of each clamping ring half. A long ring pin is positionable through the apertures in the first ends of the clamping ring halves and the mounting projections for securing the clamping ring halves in a predetermined orientation on the mounting base. A plurality of apertures extends through a second end of each clamping ring half. A short ring pin is positionable through one of a plurality of apertures in the upper end of each clamping ring half to secure the clamping ring halves in a predetermined orientation with respect to each other for thereby defining the size of the cable receiving opening through the clamping ring halves.

Lastly, for the purpose of summarizing the invention, the invention may be incorporated into an improved cable clamp strip for securing together wires of a cable bundle in a predetermined orientation and for routing such secured wires in a predetermined path. The cable clamp strip comprises a mounting base formed of a flexible, molded plastic with notches formed in its side edges for increased flexibility in a first direction and with notches formed in its lower surface for increased flexibility in a second direction. Apertured mounting projections extend upwardly from the upper surface of the mounting base. Clamping ring halves are adjustably secured with respect to the mounting projections with a lower aperture extending through the lower end of each clamping ring half and with a plurality of upper apertures extending through the upper end of each clamping ring half. A long ring pin is positioned through the lower apertures of the mounting ring halves and the mounting projections to secure the clamping ring halves in a predetermined orientation on the mounting base. A short ring pin is positioned through one of the plurality of upper apertures of each clamping ring to secure the clamping ring halves in a predetermined orientation with respect to each other for thereby defining the size of the opening through the clamping ring. The cable clamp strip further includes a closed retaining ring fixedly positioned on the upper surface of the mounting base.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific embodiment may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in conjunction with the accompanying drawings which:

FIG. 2 is a plan view of a portion of a typical cable clamp strip of the type shown in FIG. 1.

FIG. 3 is a front elevational view of the cable clamp strip shown in FIG. 2.

FIG. 4 is a side elevational view of the cable clamp strip shown in FIGS. 2 and 3.

FIG. 5 is an illustration of the short ring pin positionable through the upper ends of the clamping ring halves to hold the clamping rings in proper orientation with respect to the cables.

FIG. 6 is an illustration of the long ring pin positionable through the lower ends of the clamping ring halves and the mounting base to hold the clamping rings in proper orientation with respect to the base.

FIGS. 8 and 9 are sectional views of alternate components for securing the cable clamp strip of the previous Figures onto various supporting surfaces.

Similar reference characters refer to similar parts throughout the several drawings.

DETAILED DESCRIPTION OF THE INVENTION

Figure 1:
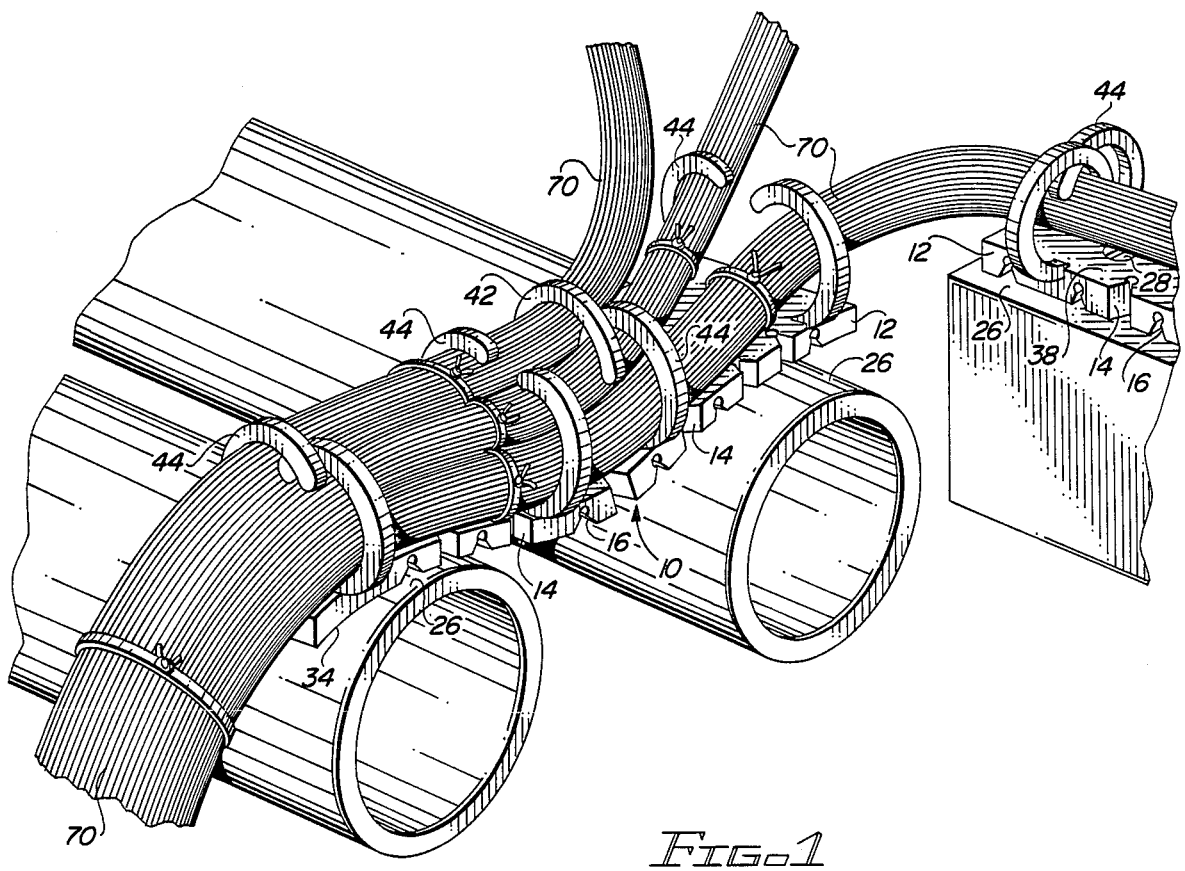
FIG. 1 is a perspective illustration of a plurality of cable clamp strips constructed in accordance with the principles of the present invention securing and routing various bundles of cables in predetermined paths.

With reference to FIG. 1, there is shown a plurality of cable clamp strips 10 constructed in accordance with the principles of the present invention. Each cable clamp strip 10 includes a mounting base 12 of a generally rectangular cross-sectional configuration and of a predetermined extended length. Each mounting base 12 is fabricated of a flexible elastomeric material such as suitable plastic. Flexibility of the base is increased by forming cut-out sections or V-shaped notches 14 and 16 in the mounting base. The notches 14 and 16 may be molded directly into the plastic or, in the alternative, they may be cut into the previously formed rectangular mounting base blank.

Lateral flexibility in a first meridian or horizontal plane is increased by a plurality of V-shaped edge notches 14 formed in both side edges 20 of the mounting base 12. Each of the edge notches 14 extends about one-fourth the distance inwardly toward the longitudinal centerline 22 of the mounting base 12 and cable clamp strip 10. As a result, the central half 24 of the mounting base 12 is essentially solid, not being provided with such notches. The edge notches 14 are preferably symmetric in their configuration and are at spaced locations along each edge 20. In those embodiments where the mounting base 12 is to be attached to a supporting surface 26 by a screw or clip 28 extending through the mounting base 12, attachment holes 30 are formed through the mounting base. In such cases, edge notches are not provided thereadjacent to ensure the strength of the hole 30 and the integrity of the attachment to the supporting surface 26.

Similarly, V-shaped bottom notches 16 are provided extending upwardly from the bottom or lower surface 34 of the mounting base 12 to allow for upward and downward movement in a second meridian or vertical plane. These bottom notches 16 are similar in size and shape to the edge notches 14 and extend upwardly about 50 percent of the thickness of the mounting base. The apex of each edge and bottom notch 14 and 16 is preferably formed with a generally semicircular cutout 36 to enhance the strength and flexibility of the mounting base. If the notches terminated in simple V-shaped configurations, the point of each such V would receive all of the generated stresses and thereby increase the chance of tearing. By using a semicircular cutout at the apex of each notch, any stresses generated in or around the area of the notch will be spread around the semicircular area thus preventing a single point, a simple V-shaped apex, from receiving all of the pressure induced by any flexure and associated stresses. The edge notches 14 also provide for lateral flexibility in a first meridian while the bottom notches 16 provide for flexibility in a second meridian to thereby impart a universal flexibility to effect positioning and routing on irregular or circuitous supporting surfaces.

As used herein, the terms upper and lower, horizontal and vertical, and the like, are used for descriptive purposes only. It should be readily understood that the cable clamp strip of the present invention could readily be utilized in an orientation inverted with respect to the showing of FIG. 1. The cable clamp strip could also be utilized at any angular orientation with respect thereto.

Extending upwardly from the upper surface 38 of the mounting base 12 are a plurality of rings 40, 42 and 44. The rings may either be retaining rings 40 and 42 of a fixed size and position or they may be clamping rings 44 adjustable in size as well as position. All of the rings, however, have a common purpose of securing and routing cables in a proper immovable position with respect to the supporting surface 26 upon which they are utilized.

The embodiment shown in FIGS. 2 through 7 illustrates a portion of a cable clamp strip 10 of the type shown in FIG. 1 with the fixed retaining rings 40 and 42 being constructed in a closed loop in predetermined orientations laterally offset with respect to the longitudinal centerline 22 of the mounting base 12 and cable clamp strip 10. The forward retaining ring 40 is formed in a fixed position offset to one side of the mounting base 12 while the other retaining ring 42 is offset to the other side. It should be readily understood, however, that any number of retaining rings could be utilized in a mounting base 12 and any one or more might be symmetrically located between the two shown retaining ring positions along the longitudinal centerline.

Also located on the mounting base, as best known in the embodiment of FIGS. 2 through 7, is a clamping ring means 44. The clamping ring means 44 is adjustably secured to a pair of spaced mounting projections 46, 48 upstanding from the mounting base. The mounting projections 46 and 48 are preferably formed integrally with the mounting base 12. Each clamping ring 44 is formed of a pair of semicircular rings 52 and 54 (also referred to herein as ring halves) of symmetric construction each having an opening on one side facing the other. The lower end 56 of each ring half is provided with an aperture 58 positionable in alignment with an aperture 60 in each mounting projection 46 and 48. As shown in FIG. 6, a long ring pin 64 passes through the aperture 60 of the mounting projections 46 and 48 and the lower ends 56 of the clamping ring halves 52 and 54 to adjustably secure the ring halves with respect to the mounting projections 46 and 48 and mounting base 12. The upper end 66 of each clamping ring half 52 and 54 is provided with a plurality of apertures 68 for allowing the clamping ring 44 to be expanded or contracted for accommodating cables 70 of varying diameters. The ring halves 52 and 54 as shown in FIG. 3 are secured together with their upper ends 66 overlapped to form a circular configuration. A short ring pin 74 as shown in FIG. 5 extends through aligned apertures 68 in the upper ends 66 of the clamping ring halves 52 and 54. The circular opening 76 created through the clamping ring 44 secures a cable bundle or cable 70 of a diameter equal to, or substantially equal to, that of the cable passing through the opening 78 of the fixed retaining rings 40 and 42. FIG. 3 shows the same clamping ring 44 in two positions, tilted to one side in solid lines and tilted to the other side. The tilting positions are defined by the clamping rings 44 contacting an adjacent upper edge of the mounting base 12 at a contact zone 80. Like the retaining rings 40 and 42, the clamping rings 44 may also be symmetric with respect to the centerline 22.

Figure 7:
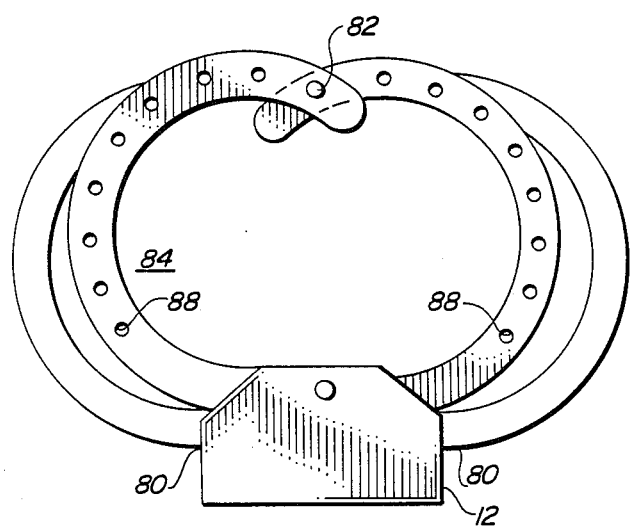
FIG. 7 is a front elevational view similar to that shown in FIG. 3 but illustrating the clamping rings in alternate positions of expansion.

The FIG. 7 illustration shows clamping ring halves 52 and 54 in alternate configurations. In a first configuration a short ring pin 74 extends through the end-most apertures 82 at the upper end 66 of the ring halves. This forms an enlarged opening 84. An opening of a reduced configuration may be effected by extending the ring pin 74 through the interior-most apertures 86 of the lower end 56 of the ring halves. FIG. 7 also illustrates the ring halves 52 and 54 in the fully open or extreme position for forming the largest opening 88 for accommodating the largest bundle of wires in a cable. The extreme position of the ring halves 52 and 54 is determined by the ring halves being restrained by the upper side edges of the mounting base 12 at a contact zone 80. Again, like the retaining rings 40 and 42, ring halves 52 and 54 of different sizes may be utilized to accommodate cables 70 of larger or smaller diameters.

It should be realized that the clamping rings 44 of the present invention may be readily located on a mounting base 12 of any length with the upstanding mounting projections 46 and 48 being located at any position along the length of the mounting base and being constructed of any particular size larger or smaller than that shown to accommodate a particular cable size. They may be of a semicircular shape as shown or, in the alternative, they may be arcuate to form an oval opening. Additionally, the mounting base 12 may be provided with any number of clamping rings 44 with or without any number of retaining rings 40 and 42, again of any particular size, shape or position along the length of the mounting base, all for accommodating any particular application.

In the primary embodiment, attachment holes 30 are formed in the mounting base 12 for receiving an attachment device shown as a screw 28, mounting pin, or the like for securing the mounting base 12 and cable clamp strip 10 in its intended orientation on a supporting surface 26. If desired, however, alternate attachment devices may be integrally formed on the lower surface of the mounting base or secured thereto. By way of example, the embodiment of FIG. 8 illustrates a pin-like attachment member 92 with a central axial slot 94 and outwardly directed wings 96 of such a size to be removably received within an aperture 98 as of a pegboard 100. The attachment member 92 has a head 102 at its interior end and a conical shaped surface 104 at its exterior end for the convenient insertion of the member through the aperture 98 of the pegboard 100. Compressing the exterior edges of the attachment member 92 into the slot 94 allows for the convenient removal of the member 92 from the aperture 98 and the appropriate repositioning of the mounting base 12 and cable clamp strip 10 and cable 70.

The particular configuration of the short ring pin 74 and the long ring pin 64 as shown in FIGS. 5 and 6 are preferably of the same general configuration of the pin-like attachment member 92 as disclosed in FIG. 8. This allows for the easy insertion and removal of such ring pins during the rerouting of cable during operation and use.

The FIG. 9 attachment member 108 is in the form of a C-shaped clamp 110 integrally formed in the lower face of the mounting base 12. The C-shaped clamp 110 is resilient and has an opening 112 which allows the snapping action of the clamp 110 onto a recipient supporting surface such as a pipe or other cylindrical object. The resiliency of the clamp allows for easy attachment and removal of the mounting base 12, cable clamp strip 10, as well as the cable 70 from the supporting surface.

The present disclosure includes that contained in the appended claims as well as that of the foregoing description. Although this invention has been described in its preferred forms with a certain degree of particularity, it is understood that the present disclosure of the preferred form has been made only by way of example and that numerous changes in the details of construction and combination and arrangement of parts may be resorted to without departing from the spirit and scope of the invention.

Now that the invention has been described, what is claimed is:

1. An improved cable clamp strip for securing together wires of a cable bundle in a predetermined orientation and for routing such secured wires in a predetermined path comprising:
   a mounting base formed of a flexible, molded plastic with notches formed in its side edges for increased flexibility in a first direction and with notches formed in its lower surface for increased flexibility in a second direction;
   apertured mounting projections extending upwardly from the upper surface of the mounting base,
   clamping rings having upper and lower ends adjustably secured with respect to the mounting projections with a lower aperture extending through the lower end of each clamping ring and with a plurality of upper apertures extending through the upper end of each clamping ring,
   a long ring pin positioned through the lower apertures of the clamping rings and the mounting projections to secure the clamping rings in a predetermined orientation on the mounting base; and
   a short ring pin positioned through one of the plurality of upper apertures of each clamping ring to secure the clamping rings in a predetermined orientation with respect to each other for thereby defining the size of the opening through the clamping ring.

2. The cable clamp strip as set forth in claim 1 and further including a closed retaining ring fixedly positioned on the upper surface of the mounting base.

3. A strip clamp for cables having one or more conductor bundles for securing the bundles in independent orientations,
   an elongate base strip,
   mounting means attached to said base strip,
   a pair of partially open rings extend over a portion of a circular path greater than a semicircle each having an opening,
   first means for securing the rings to the mounting means at one of their ends for movement about at least one axis generally aligned with the base strip and cable bundle to be secured,
   said rings being arranged to present an opening towards each other when separated away from each other by movement about said first means,
   means on each ring forming a plurality of spaced interconnects thereon,
   second means for securing the rings together at any of several intermediate positions of closure by interconnecting any selected two of said interconnects, one selected from each ring, so that the rings are independently positionable with respect to the strip and to each other to overlap in a progressive manner over a range of one interconnect overlap to several to define from one opening to several of a variable size and laterally separated positions for securing one or more separate cable bundles of varying diameters to said strip and in separate channels with a single clamp.

4. The device as set forth in claim 3 wherein said strip is formed of a molded plastic with notches formed therein for increased flexibility in a first direction and with notches formed elsewhere therein for increased flexibility in a second direction different from said first direction.

5. The device as set forth in claim 3 wherein said first means and each clamping ring is formed with an aperture for adjustably positioning the rings with respect to the strip.

6. The device as set forth in claim 5 in which said clamping rings define upper and lower ends, and in which said second means include pin means for coupling together the upper ends of the clamping rings to each other and further including pin means for coupling the lower ends of the clamping rings to the mounting means.

7. The strip clamp as set forth in claim 3 and further including at least one closed retaining ring mounted in a fixed position on the base strip in a direction along the path of the bundle being secured.

8. An extended cable clamp comprising a plurality of cable clamp strips as in claim 7 arranged end-to-end to form a repeating structure.

9. The strip clamp as in claim 7 in which said closed ring is offset laterally from the bundle direction defined by the partially open ring pair.

10. The strip clamp as in claim 3 in which said mounting means is provided with an aperture, and said rings are each provided with an aperture extending through a first end of each clamping ring; a long ring pin positioned through the apertures in the first ends of the clamping rings and the mounting means for securing the clamping rings in a predetermined orientation on the mounting means; a plurality of apertures extending through a second end of each clamping rings; and a short ring pin positioned through one of said apertures in the upper end of each clamping ring to secure the clamping rings in a predetermined orientation with respect to each other for thereby defining the size of the cable receiving opening through the clamping rings.

* * * * *